(12) United States Patent
Fantini et al.

(10) Patent No.: US 8,087,833 B2
(45) Date of Patent: Jan. 3, 2012

(54) PLUG PARTS FOR AN OPTICAL PLUG CONNECTION

(75) Inventors: Dionigi Fantini, Ghirla (IT); Sergio Belli, Verbania (IT)

(73) Assignee: Diamond SA, Losone (CH)

( * ) Notice: Subject to any disclaimer, the term of this patent is extended or adjusted under 35 U.S.C. 154(b) by 383 days.

(21) Appl. No.: 12/448,742

(22) PCT Filed: Jan. 25, 2008

(86) PCT No.: PCT/EP2008/050894
§ 371 (c)(1),
(2), (4) Date: Jul. 2, 2009

(87) PCT Pub. No.: WO2008/095798
PCT Pub. Date: Aug. 14, 2008

(65) Prior Publication Data
US 2010/0008629 A1    Jan. 14, 2010

(30) Foreign Application Priority Data

Feb. 8, 2007  (CH) .......................................... 213/07
Apr. 19, 2007 (CH) .......................................... 643/07

(51) Int. Cl.
*G02B 6/36* (2006.01)
(52) U.S. Cl. ................. 385/78; 385/76; 385/77; 385/81
(58) Field of Classification Search .............. 385/76–78, 385/81
See application file for complete search history.

(56) References Cited

U.S. PATENT DOCUMENTS

| | | | |
|---|---|---|---|
| 4,804,243 A | 2/1989 | Borsuk et al. | |
| 5,923,804 A * | 7/1999 | Rosson | 385/81 |
| 7,104,702 B2 * | 9/2006 | Barnes et al. | 385/77 |
| 7,204,644 B2 * | 4/2007 | Barnes et al. | 385/77 |
| 2001/0002220 A1 * | 5/2001 | Throckmorton et al. | 385/66 |
| 2005/0213892 A1 | 9/2005 | Barnes et al. | |
| 2006/0115219 A1 * | 6/2006 | Mudd et al. | 385/62 |
| 2007/0110371 A1 * | 5/2007 | Zimmel et al. | 385/56 |

FOREIGN PATENT DOCUMENTS

| | | |
|---|---|---|
| CH | 689 316 A5 | 2/1999 |
| EP | 0 571 325 A1 | 11/1993 |
| EP | 0 601 976 A1 | 6/1994 |
| EP | 1 335 222 A1 | 8/2003 |
| WO | WO 01/61813 A2 | 8/2001 |
| WO | WO 2004/001471 A1 | 12/2003 |
| WO | WO 2005/096050 A2 | 10/2005 |

* cited by examiner

*Primary Examiner* — Rhonda Peace
(74) *Attorney, Agent, or Firm* — The Nath Law Group; Jerald L. Meyer; Derek Richmond (57) ABSTRACT

A plug part (1) for an optical plug connection comprises one pin holder (3) in which a plug pin (2) for retaining an optical waveguide which extends over a longitudinal central axis (L) is held. The pin holder (3) can be pushed into a plug housing (4) via a cable-side opening (30) and locked therein in a mounting position, wherein the plug pin (2) is held axially resiliently in the plug housing (4) with the aid of a separate spring element (5). The spring element (5) can here be inserted in a mount in the plug housing (4) before the pin holder (3) is pushed in. The spring element (5) is secured by way of a clamping sleeve (6) which can be inserted into the mount via the plug-side opening (30) in the push-in direction (e). Arranged in the mount is a circlip (7) and the pin holder (3) has a groove (12) which can be brought into engagement with the circlip (7) in a latching manner in order to fix the mounting position.

16 Claims, 7 Drawing Sheets

PLUG PARTS FOR AN OPTICAL PLUG CONNECTION

This is a National Phase Application filed under 35 USC 371 of International Application No. PCT/EP2008/050894, filed on Jan. 25, 2008, the entire content of which is hereby incorporated by reference in its entirety.

The invention relates to a plug part for an optical plug-type connection in accordance with the precharacterizing clause of claim 1. Furthermore, the invention relates to a prefitted plug housing and to a pin holder for such a plug part. Then, the invention relates to a method for installing an optical fiber network. Such plug parts in which plug pins are held in axially sprung fashion in the plug housing with the aid of a spring element, have been known and in use for a relatively long time. Preferably, in this case the plug pins are prestressed in axially sprung fashion with respect to the plug housing, as a result of which when there is a plug part plugged into a socket transmission of light is ensured even in the event of tolerance discrepancies. Furthermore, these plug parts make it possible to ensure a constant compressive force between the two end faces of the plug pins of an optical plug-type connection.

WO 2004/001471 A1 has described, for example, a generically comparable plug part, in which a helical compression spring is used for generating a prestress of the plug pin, which helical compression spring is mounted within a pin holder. The pin holder comprises two casing parts which can be joined together. The pin holder is firmly anchored in a plug housing, which ensures tensile strain relief. The positioning of the spring element at the correct location between the plug pin and the pin holder has proven to be complex in practice. In addition to the fact that the plug part is comparatively difficult to fit, a further disadvantage consists in particular in the fact that the plug part is little suited for use for blow-in processes for providing buildings and other facilities with optical waveguide installations.

Methods for installing optical fiber networks using blow-in techniques have become increasingly important in recent times. It is possible, by means of blowing fiber optic cables into existing, prelaid tube systems, to bring optical waveguides to a desired location in a simple manner (for example FTTH). A blow-in method and an apparatus for blowing in fiber optic cables are disclosed, for example, by U.S. Pat. No. 6,572,081 B2. The fiber optic cables described therein have special guide devices at their ends, which guide devices can withstand the mechanical loads during the blow-in process. Once the final position on the end consumer's premises has been reached, the cables are equipped with plug parts for optical plug-type connections. For this purpose, pigtails which have been prefabricated in the factory are fastened to the bare fiber ends of the fiber optic cables, for example using splicing methods, with it additionally being necessary for space-consuming protective sheaths to be installed.

EP 1 450 187 relates to an optical plug with a sprung plug pin. Said plug pin is arranged on a pin holder, which can be pushed into the plug housing from the rear. However, the spring element is associated with the pin holder and is protected by an outer sleeve. This complicates the prefitting process and enlarges the outer diameter of the pin holder.

An object of the invention is therefore to avoid the disadvantages of the prior art, in particular to provide a plug part of the type mentioned at the outset which can be produced in a simple manner and is characterized by the fact that it can be fitted easily. Furthermore, the plug part should be inexpensive and should therefore be suitable, for example, for the application area "Fiber to the Home" (FTTH). For this purpose, the handling of the plug part when it is fitted should allow for use in the field. This object is achieved according to the invention by a plug part which has the features in claim 1.

The plug pin, in which the optical waveguide is held, is preferably fastened fixedly in the pin holder. Then, the pin holder is mounted together with the plug pin in axially sprung fashion in the plug housing. It may be advantageous here if the plug pin or the pin holder is mounted under axial prestress in the plug housing. The spring element can be arranged in the bearing location on the outer casing of the pin holder, as a result of which suitable spring elements can be used which are simple to handle during fitting. The spring element can be matched to the corresponding bearing in the plug housing in such a way that it can be prefitted in a simple manner before the pin holder is pushed into the plug housing. The spring element may be, for example, a helical compression spring. The spring element could also be in the form of a sleeve, for example, or be interrupted in skeletal fashion. A skeletal spring arrangement has been disclosed, for example, in CH 689 316 A5, in which the spring is integrated in one piece in the pin holder, however. Other types of spring are of course also conceivable, however.

In a first embodiment, an at least partially circumferential shoulder can be arranged in the bearing, which shoulder delimits the spring path of the spring element in the direction of the longitudinal mid-axis and defines a spring-accommodating section for the spring element. A shoulder which is provided in the region of the bearing inner side of the plug housing can directly or indirectly form a stop for the spring element. The spring element can be secured in relation to the opposite direction by a securing element, which can be inserted into the bearing and can be or is fixed in the bearing by a force-fitting and/or form-fitting connection. In this way, the securing element can be fastened in a simple manner to the bearing interior of the bearing of the plug housing. A further advantage of this arrangement is the fact that the prestress of the spring element can be set variably. Depending on how deeply the separate securing element is inserted in the bearing, the helical compression spring is compressed to a different degree.

It may be advantageous if the spring element is secured by a clamping sleeve, which can be inserted into the bearing in the push-in direction via the cable-side opening. The use of clamping sleeves as securing elements ensures a sufficiently secure fit of the clamping sleeve in the bearing of the plug housing. Alternatively, it would also be conceivable to use a sleeve which is connected to the plug housing in the bearing interior by means of adhesive bonding as the securing element.

In an alternative embodiment, the spring element can be secured in the bearing in the plug housing by a clamping sleeve, which can be inserted in the opposite direction from the push-in direction via the plug-side opening. Inserting the clamping sleeve from the front in such a way has the advantage that the plug housing can be used in a versatile manner. Clearly, the clamping sleeve, on the one hand, and the pin holder with the plug pin, on the other hand, are therefore inserted or pushed into the plug housing in opposite directions. Since in this arrangement the plug housing (for example a corresponding shoulder in the bearing interior) can form a stop for the opposite direction from the push-in direction, it is possible to achieve advantageous anchoring with tensile strength. A further advantage consists in the fact that the respective components can be configured and produced in a simple manner. Then, the prefitting of the plug part using corresponding fitting apparatuses can be automated easily.

The clamping sleeve can preferably contain elevations and/or cutouts on its outer casing, which in the bearing interior of the bearing in a form-fitting manner as a result of plastic deformation. In this case, the bearing interior can be cylindrical in the corresponding spring-accommodating section. For example at least two circumferential teeth, which protrude beyond the diameter of the outer casing, can be arranged on the outer casing of the clamping sleeve. In each case one circumferential, groove-like notch can be arranged behind each tooth, it being possible for the material beads, which result from the plastic deformation, of the bearing interior of the plug housing to be accommodated in said notch. This arrangement ensures a particularly secure and fixed fit of the clamping sleeve in the bearing of the plug housing.

The plug housing can be made from plastic, at least in the region of the bearing interior, and the clamping sleeve can be made from metal. Preferably, in this case a comparatively soft metal such as bronze or nickel silver, for example, which can likewise be deformed easily during the insertion process, is preferably used. Such material combinations are advantageous when the above-described plastic deformation is intended to occur during the insertion process for forming an additional form-fitting connection.

In a further embodiment, the bearing location of the pin holder in the plug housing can be predetermined by latching means. Such latching connections are characterized by the fact that they can be handled easily. The latching means can be separate component parts, which can be inserted into the spring-accommodating section of the bearing either via the plug-side or the cable-side plug opening, depending on the configuration of the plug housing.

It can be particularly advantageous if a circlip is arranged in the bearing, and if the pin holder has a groove, which can be brought into latching engagement with the circlip in order to fix the bearing location. In this case, the circlip can be mounted in the bearing displaceably at least in one direction, starting from its rest position, preferably only in one direction. The displacement in the opposite direction would then be ruled out by a corresponding stop. This stop can be formed, for example, by the abovementioned circumferential shoulder or by the clamping sleeve. Conventional or specially manufactured rings made from spring steel, which are interrupted so as to permit radial expansion, can be used as the circlip. However, instead of circlips other latching means could in principle also be provided which are capable of radial expansion.

A spacer sleeve, which is axially displaceable in the bearing, can be arranged between the circlip and the spring element. This spacer sleeve can form a stop for the spring element.

For a configuration of the plug part with tensile strength, the spacer sleeve can have a conical section on the inside, which acts as a run-on flank for the circlip. When a tensile force is exerted on the fiber optic cable, the circlip can run onto the conical section, as a result of which the circlip compresses slightly radially and thus reinforces the latching connection with respect to the pin holder. With this arrangement, the pin holder can be prevented from being withdrawn in an undesirable manner or dismantled from the plug housing in a simple manner.

As an alternative to the abovementioned embodiment, however, it would also be conceivable to associate the circlip with the at least partially circumferential shoulder. In this case, the circlip could bear directly against the shoulder, at least in a rest position. However, it would of course also be conceivable here to use a spacer sleeve.

Particularly advantageously, the clamping sleeve or the spacer sleeve can have a circumferential notch or a circumferential groove for accommodating the circlip or for resting said circlip thereon, which notch or groove is dimensioned in such a way that it permits the circlip to expand during the push-in process of the pin holder into the plug housing for producing the bearing location. The notch can be arranged on an end of the clamping sleeve, which end faces the circlip, or on an end of the spacer sleeve, which end faces the circlip.

The pin holder can have a positioning section, and the plug housing can have a positioning arrangement, which is operatively connected to the positioning section, as a result of which the pin holder is or can be held in the bearing of the plug housing in such a way that it is secured against rotation.

The pin holder can be substantially rotationally symmetrical, but at least the cylindrical outer casing of the pin holder is interrupted by a preferably planar incipient cut so as to form an anti-rotation means. In this case, sections of the plug housing can correspondingly be configured in complementary fashion on the inside. In this case, the incipient cut preferably runs in the direction of the longitudinal mid-axis. It may be particularly advantageous if the cylindrical outer casing is interrupted only by one planar incipient cut. It is of course also possible for a plurality of such incipient cuts to be provided on the outer casing. The incipient cut can, for example, in this case be moved inwards with respect to the cylindrical outer casing in such a way that the circumferential groove for the circlip is interrupted in the region of the incipient cut. This arrangement provides a latching connection, in which the circlip only engages in a subsection of the entire circumference of the pin holder. In this way, an embodiment would even be conceivable in which the pin holder could be dismantled relatively easily from the plug housing, depending on the dimensions of the circlip.

A prefitted plug housing for the above-described plug part with a spring element inserted therein can also be advantageous per se. In this case, the spring element can be secured by a clamping sleeve, which is inserted into the bearing and is fixed in the bearing by means of a force-fitting and/or form-fitting connection.

Likewise, a pin holder per se can also be advantageous. In particular, a pin holder which is fastened on one end of a fiber optic cable is suitable for being used when laying an optical fiber network in a desired location (for example at an end consumer's place of residence) using blow-in methods. Thus, the pin holder can be connected to one end of a fiber optic cable and can be conveyed through a tube system by means of a blow-in method. Subsequent welding or splicing of the optical waveguide with an optical plug component after laying is therefore no longer required. The pin holder only needs to be pushed into a corresponding plug part in order to form an optical plug-type connection. Pin holders with integrated springs of the type disclosed in WO 2004/001471 A1 have proven to be too sensitive for use in blow-in methods in tests, owing to the comparatively filigree configuration of the pin holder.

When conveyed through the tube systems, the pin holders with the plug pins are often damaged. The present pin holder according to the invention with plug pins fixedly installed have proven to be significantly more robust. The pin holder can be pushed into the above-described plug housing and locked there in a bearing location. The pin holder can in this case have a groove on its outer casing, which groove can be brought into latching engagement with a circlip or another securing element of the plug housing in order to fix the bearing location.

A further aspect of the invention relates to a method for installing an optical fiber network in particular for "Fiber to the Home" applications, in which a fiber optic cable, which has a pin holder with a plug pin and an optical waveguide held therein fastened on the end of said fiber optic cable, is conveyed through a tube system to a desired location by means of a blow-in method. In telecommunications, the laying of optical waveguides as far as into the place of residence of an end consumer, for example, is referred to as "Fiber to the Home" (abbreviated as "FTTH"). Of course the method is also suitable for other application areas which are known, for example, by the abbreviations FTTL, FTTC, FTTN or FTTB. Then, the pin holder can be pushed into a plug housing and locked there in latching fashion in a bearing location so as to produce an optical plug part.

Further advantages and individual features of the invention are given in the description below relating to exemplary embodiments and in the drawings, in which:

FIG. 6 shows a perspective illustration with a prefitted plug housing in a longitudinal section and a pin holder for the plug part shown in FIG. 5, FIG. 7 shows the plug part shown in FIG. 5 with the prefitted plug housing and a pin holder which is first partially pushed in.

Figure 1:
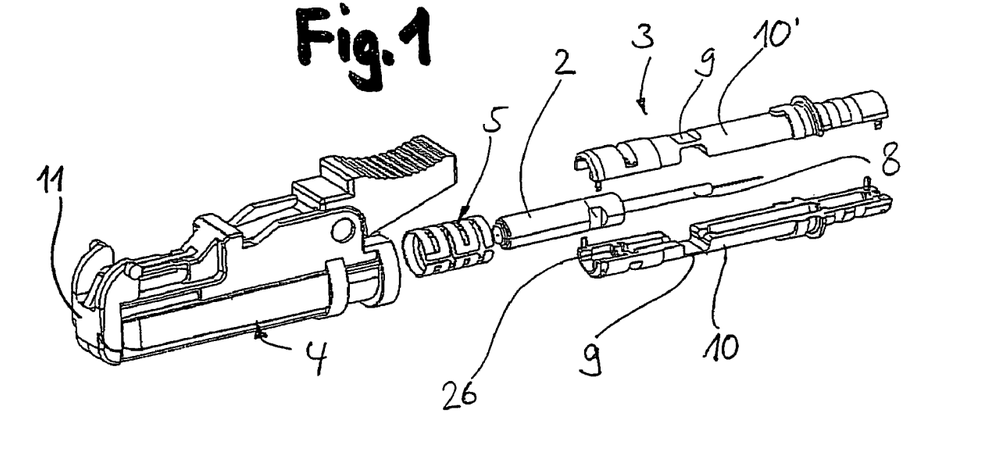
FIG. 1 shows a perspective, exploded illustration of a plug part according to the invention.

FIG. 1 shows a plug part, denoted by 1, for an optical plug-type connection with an approximately sleeve-shaped pin holder 3, which can be pushed into a plug housing and locked there. The outer configuration of the plug housing 4 in the present exemplary embodiment corresponds to that of the plug type by the applicant known under the designation "E-2000™".

The pin holder 3 has substantially the same design as the pin holder from WO 2004/001471, with the exception of the configuration of the spring arrangement. However, in the present exemplary embodiment, the pin holder is not fixedly anchored in the plug housing, as in WO 2004/001471. Cable strain-relief means are therefore not provided. The pin holder 3 comprises two shell parts 10 and 10', which can be joined to one another and which have casing parts which can be split into a pin-accommodating section and into a cable-accommodating section 7 along the longitudinal mid-axis. The casing parts of the pin-accommodating section and of the cable-accommodating section are each connected to one another in articulated fashion by a film hinge 9. The plug pin 2 is provided with two planar-parallel cutouts on its outer casing. A pair of corresponding ribs on the inner side of the pin-accommodating section engage in a form-fitting manner in these cutouts, as a result of which the plug pin is fixed in the direction of the longitudinal mid-axis. Further design details of the configuration of the pin holder can be gleaned from the abovementioned document. Other configurations of the pin holder are of course also conceivable. The fixed installation of the plug pin in the pin holder could also be released in another way, for example, however. It would of course also be conceivable in principle to permit at least one path in the direction of the longitudinal mid-axis. Furthermore, the pin holder could also be constructed from rigid shell parts which can be joined together, as in EP 1 335 222 A1. Splitting the pin holder along the longitudinal axis is not absolutely necessary for the solution according to the invention in relation to the stated object, however.

Furthermore, a spring element 5 is shown which has the shape of a hollow cylinder which is interrupted in skeletal fashion. The spring element 5 is generally inserted into a corresponding bearing in the plug housing 4 prior to the pin holder 3 being pushed in. Such a prefitted plug housing is illustrated in FIG. 4 below.

Figure 2:
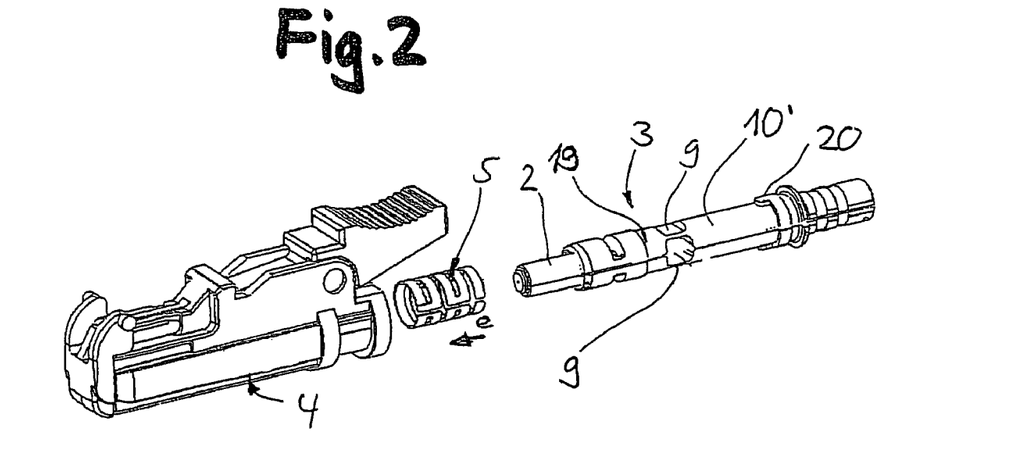
FIG. 2 shows the plug part shown in FIG. 1 with a pin holder and a spring element prior to said pin holder being pushed or inserted into a plug housing.

As is apparent from FIG. 2, a pin holder 3 can be pushed into a plug housing 4 in the e direction and locked there. A plug pin 2 which is adjoined by a fiber optic cable 8, is held in the pin holder 3. In this state, the pin arrangement can be pushed into the plug housing 4 and locked there in a bearing location in a simple manner.

Figure 4:
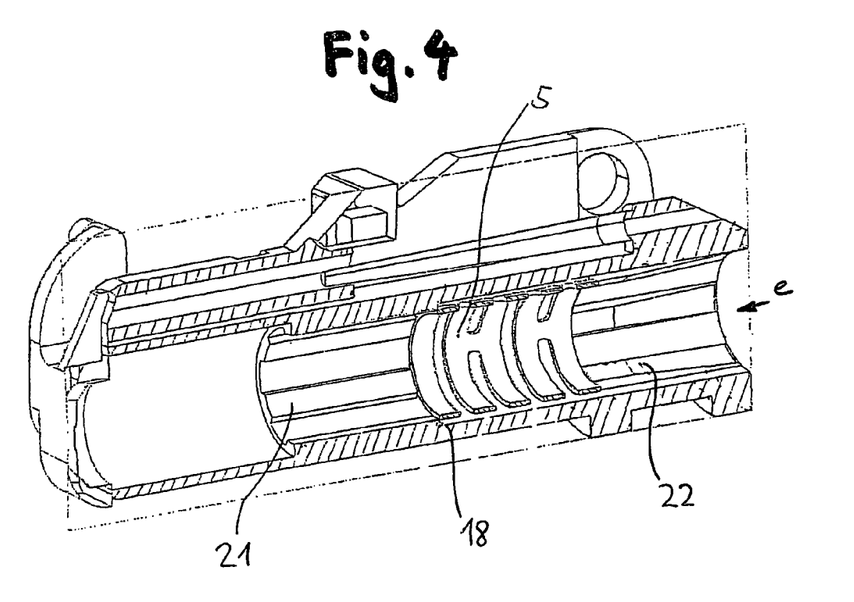
FIG. 4 shows a perspective illustration of a prefitted plug housing with a spring element inserted therein in a longitudinal section, into which plug housing the pin holder shown in FIG. 2 can be inserted.

As can be seen from the sectional illustration shown in FIG. 4, the shoulder 18 of the bearing segment 21 forms a stop for the spring element 5. FIG. 4 shows the seat of the spring element 5 in the plug housing 4 in the rest position in the bearing. The spring element 5 is mounted in a cavity in the housing interior of the plug housing 4. The front end of the spring element 5 is supported on a stop, which acts in the push-in direction, for the spring element. This stop is configured as a partially circumferential shoulder and is clearly formed by individual shoulder segments 18, which are distributed over the circumference and are arranged in the inner casing of the plug housing. The shoulder segments 18 are predetermined by ribs 21 running in the longitudinal direction. On the opposite side, i.e. at the cable-side end of the spring element 5, it is likewise supported by shoulder segments which form a stop for the spring element in the opposite direction. In this case, too, the shoulder segments are predetermined by individual ribs 22, which are arranged in the inner casing of the plug housing and are distributed over the circumference.

The front end of the spring element 5 is supported on the pin holder 3 in the push-in direction e by a circumferential shoulder 19 (FIG. 2). However, the shoulder 18 of the plug housing 4 also forms a stop for the front end of the spring element 5 in the event of a displacement in the push-in direction e. On the cable side, the shoulder of the plug housing 4 forms a stop for the spring element 5 in relation to the opposite direction.

Figure 3:
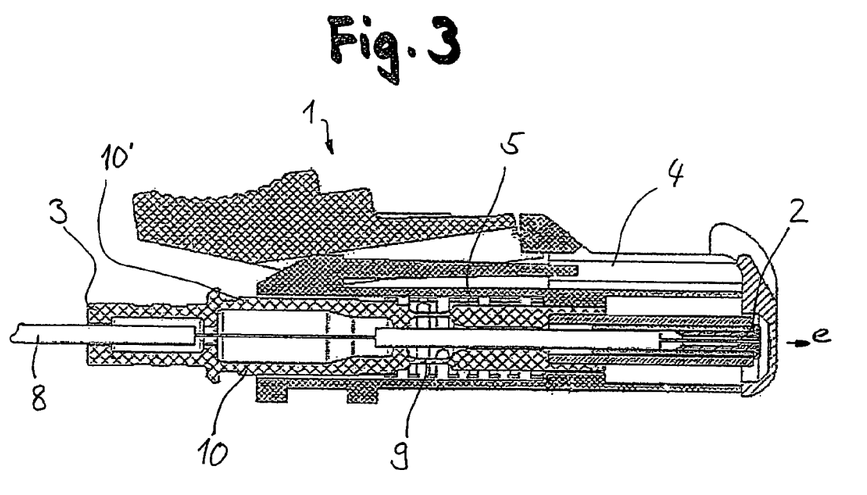
FIG. 3 shows a longitudinal section through a ready-fitted plug part as shown in FIG. 1.

As is shown in FIG. 4, the shoulders or shoulder segments are each predetermined by the ends of the respective ribs 21 and 22. A cavity for the bearing in which the spring element can be accommodated is illustrated between the shoulders or the shoulder segments. It is apparent from FIG. 4 that the cavity is dimensioned in such a way that a gap is formed between the spring element 5 and the inner casing of the plug housing 4. This gap serves the purpose of permitting the radial expansion of the spring element during the push-in process (cf. also FIG. 3).

Figure 5:
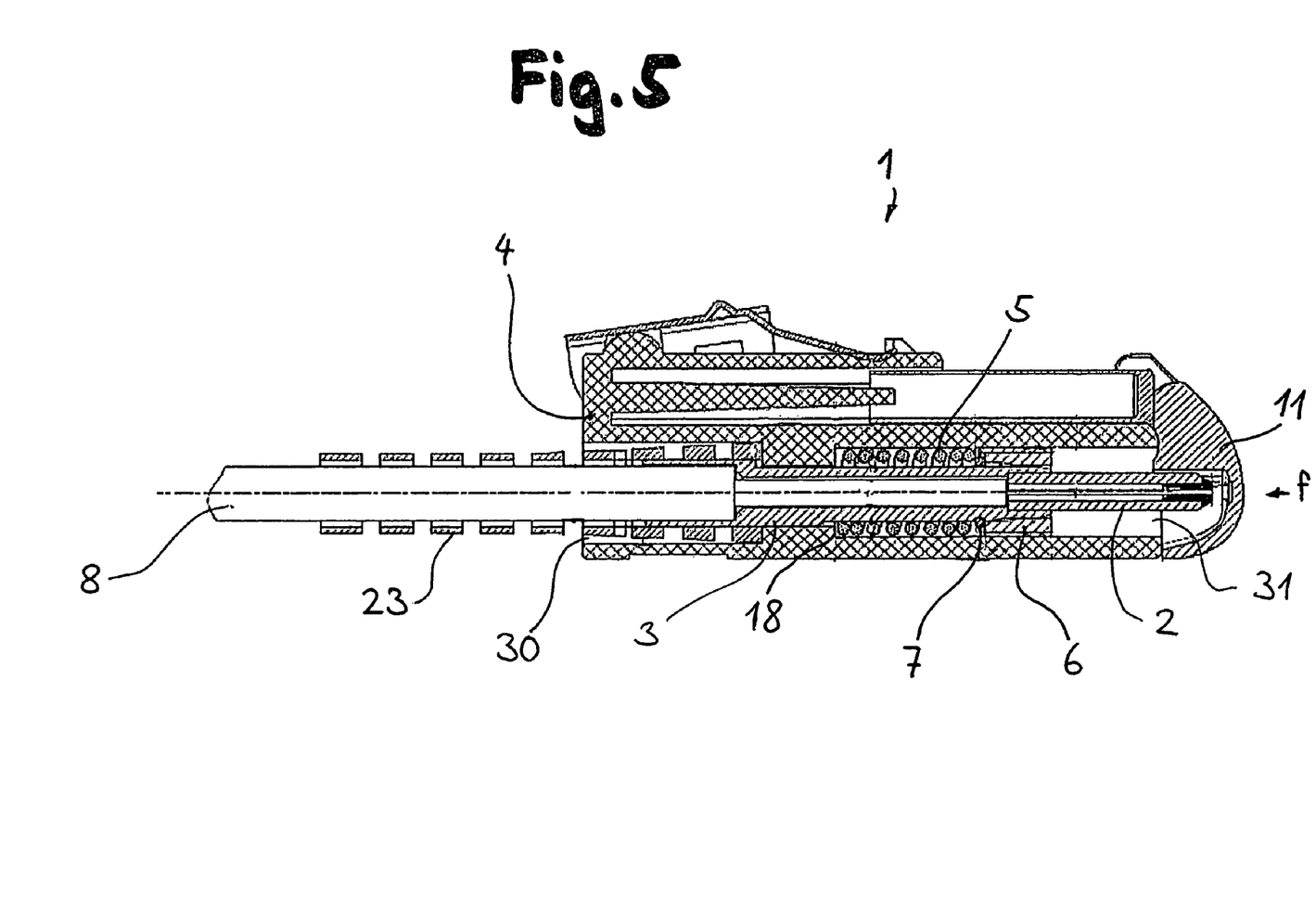
FIG. 5 shows a longitudinal section through a plug part in accordance with a further exemplary embodiment.

FIG. 5 shows a plug part 1, in which the bearing for the spring element 5 is predetermined firstly by the shoulder 18 and secondly by a sleeve-shaped securing element 6, which can be inserted into the bearing. This separate securing element is fixed in the region of the spring-accommodating section of the bearing by means of a force-fitting and/or form-fitting connection. A spring-accommodating section for the spring element 5 extends from the plug-side plug opening 31 in the f direction up to the circumferential shoulder 18. The bearing interior in the region of the spring-accommodating section is cylindrical. The securing element 6 is pushed in via the plug-side opening 31 of the plug housing 4. The plug opening 31 in FIG. 5 is sealed by a protective cover 11, which protects the front end of the plug pin 2. The plug housing 4 in the present exemplary embodiment corresponds to that of the plug type by the applicant known under the designation "F-3000™". The outer contour of the plug housing can of course also have a different design, in particular it is intended to correspond to conventional plug types such as E-2000, FC, SC etc.

FIG. 5 shows a latching means, which is denoted by 7, and with the aid of which the pin holder 3, which has been pushed into the plug housing 4, can be locked in latching fashion in a bearing location. The latching means, which is preferably in the form of a circlip 7, bears against the cable-side end of the sleeve-shaped securing element 6. The spring element in the form of a helical compression spring furthermore adjoins the circlip 7. An anti-kink means 23, which reaches partially into the cable-side opening 30 of the plug housing, is arranged on the cable-side end of the pin holder 3.

Figures 6, 7:
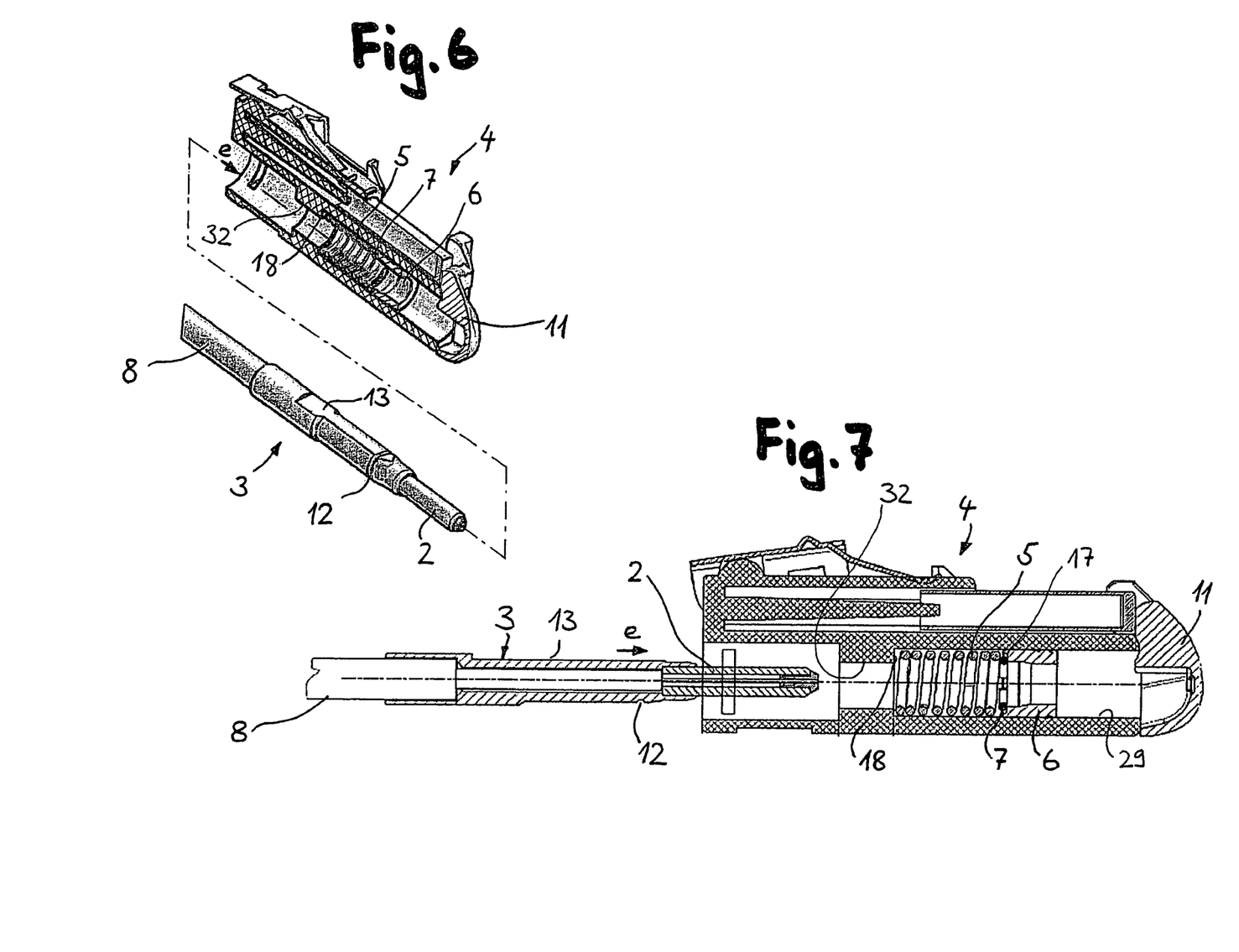

FIG. 6 shows a perspective illustration once again of the construction of the plug part. It is apparent from FIG. 6 in particular that the pin holder 3 has a (single) planar incipient cut 13, which interrupts the cylindrical outer casing of the pin holder. This incipient cut 13 runs in the direction of the longitudinal mid-axis. A correspondingly complementary planar inner section 32 is arranged in the bearing of the plug housing 4 as a mating piece for the incipient cut 13. This ensures that the plug pin 2 or the pin holder 3 in the plug housing 4 is firstly secured against rotation and secondly positioned in angularly accurate fashion. A groove 12, which can be bought into engagement with the circlip 7 for the latching connection, is arranged on the outer casing of the pin holder 3. The plug housing 4 is made from plastic, at least in the region of the spring section of the bearing interior 2. The clamping sleeve 6 is made from metal, with use preferably being made of a comparatively soft material such as bronze or nickel silver.

FIG. 7 shows that the groove 12 is interrupted in the region of the planar incipient cut 13, with the result that the groove is interrupted in this region or there is no groove-like notch here. The securing element 6 is in the form of a clamping sleeve, which ensures a sufficiently firm fit in the cylindrical bearing interior. A notch 17 is shown at that end of the clamping sleeve 6 which faces the circlip, with the circlip 7 being partially accommodated in said notch. In this case, the notch 17 is dimensioned in such a way that it permits a radial expansion of the circlip 7 during the push-in process (the push-in direction is indicated by the arrow e) of the pin holder into the plug housing 4.

Figure 8:
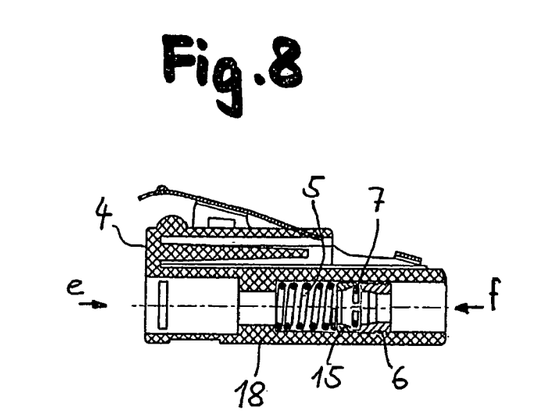
FIG. 8 shows a longitudinal section through a further prefitted plug housing.

The prefitted plug housing 4 shown in FIG. 8 differs substantially from the preceding exemplary embodiment, in addition to a slightly modified outer configuration, by the fact that in addition a spacer sleeve 15 is provided in the bearing. The spacer sleeve 15 is mounted displaceably and is arranged between the circlip 7 and the spring element 5. The use of a spacer sleeve has the advantage that the displacement of the pin holder can take place precisely under the effect of the spring force of the spring element 5. By adapting the length of the spacer sleeve (length: expansion in relation to the longitudinal mid-axis), the desired prestress can be set precisely.

Figure 9:
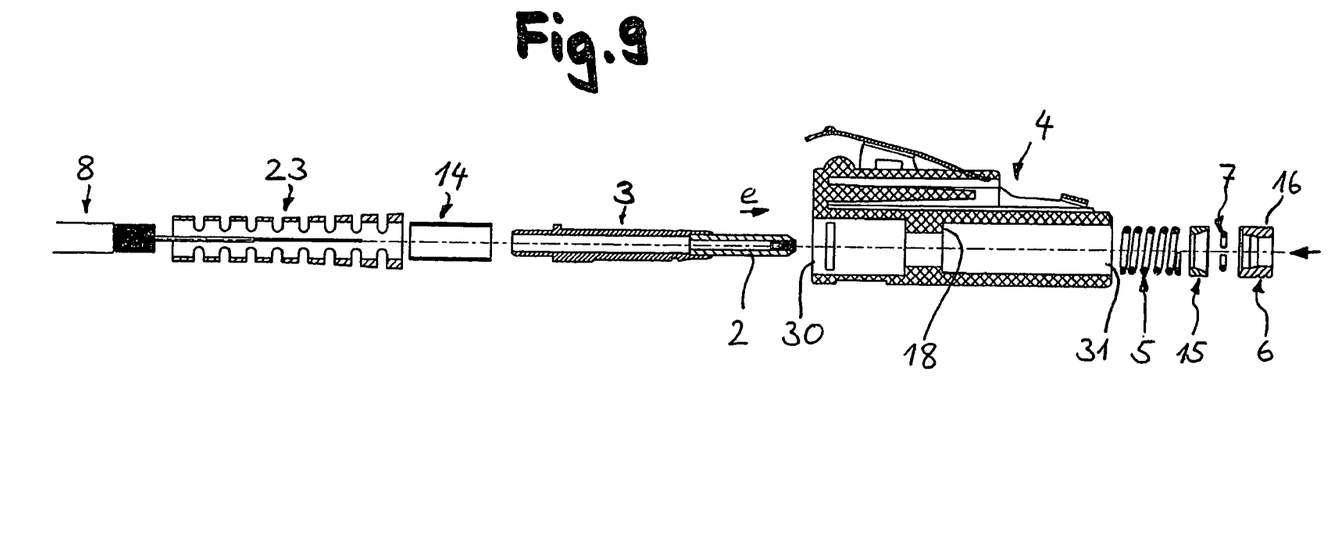
FIG. 9 shows an exploded illustration of a plug part with the plug housing shown in FIG. 8 for a plug part according to the invention.

FIG. 9 illustrates in detail the essential components of a plug part. It is apparent from this figure, for example, that the pin holder 3 with the plug pin 2 is pushed into the plug housing 4 in the push-in direction e via the cable-side plug opening 30. The components for the latching and sprung mounting of the pin holder 3, i.e. the spring element 5, the spacer sleeve 15, the circlip 7 and finally the clamping sleeve 6, are inserted into the plug housing 4 from the opposite side and in the opposite direction. These components 5, 15, 7 and 6 are therefore inserted into the corresponding bearing of the plug housing 4 in the f direction via the plug-side plug opening 31. The prestress of the spring element 5 can be set variably by the use of a clamping sleeve since the helical compression spring 5 is compressed to different degrees or not at all depending on how deeply the clamping sleeve has been inserted in the bearing or depending on the length of the spacer sleeve 15.

Figure 9A:
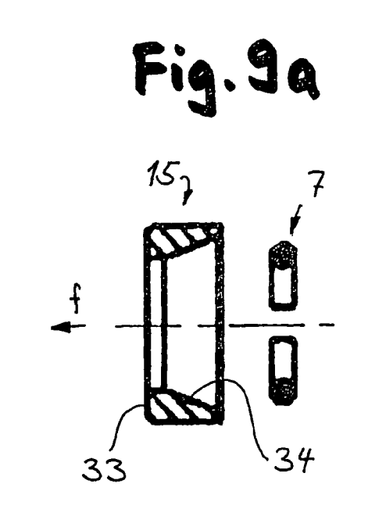
FIG. 9*a* shows a very enlarged illustration of a spacer sleeve and of a circlip of the plug part shown in FIG. 9.

Design details of the spacer sleeve 15 are shown in the very enlarged illustration in FIG. 9a. In the region of the side facing the circlip 7, the spacer sleeve has, on the inside, a conical section 34, which tapers in the f direction. The conical section 34 has the effect that, when a tensile force is exerted on a fiber optic cable (not shown), the circlip 7 runs onto the conical section 34 (the pin holder and therefore also the circlip 7 are displaced in the f direction during tensioning) and that, as a result, the circlip 7 contracts easily radially, as a result of which the latching connection with respect to the pin holder is reinforced. An undesired withdrawal (or dismantling) of the pin holder from the plug housing can be prevented in a simple manner by means of the conical section. In the region of the side opposite the circlip 7 or the side facing the spring element, the spacer sleeve 15 has, at one end, a bearing face 33 for the corresponding end of the spring element.

FIG. 9 furthermore shows that a crimping sleeve 14 for fastening the fiber optic cable 8 in the pin holder 3 is provided at the cable-side end of the pin holder 3. The anti-kink means 23 is then turned thereover.

Figure 10:
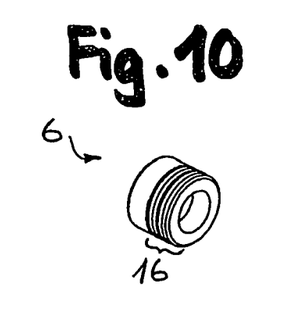
FIG. 10 shows a clamping sleeve in a perspective illustration.
Figure 11:
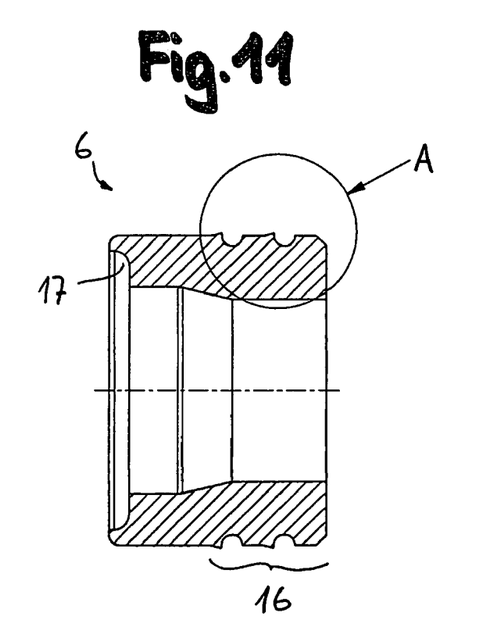
FIG. 11 shows a section through the clamping sleeve shown in FIG. 10.

As shown in FIG. 10, circumferential elevations and cutouts in the form of a toothing 16 are arranged on the outer casing of the clamping sleeve 6. The configuration of the toothing 16 is illustrated in enlarged form in the sectional illustration shown in FIG. 11. Furthermore, FIG. 11 shows a groove-like circumferential notch 17 for accommodating the circlip (not shown here) or resting said circlip thereon. As has already been mentioned with reference to FIG. 9, the notch 17 has an overdimension in the radial direction, with the result that it permits an expansion of the circlip. A first cylindrical and then a conical section adjoin the notch 17. A second cylindrical section, which has a smaller diameter than the first section, acts as a sliding face for the corresponding outer casing of the pin holder (not shown, but cf. FIG. 5, for example).

Figure 12:
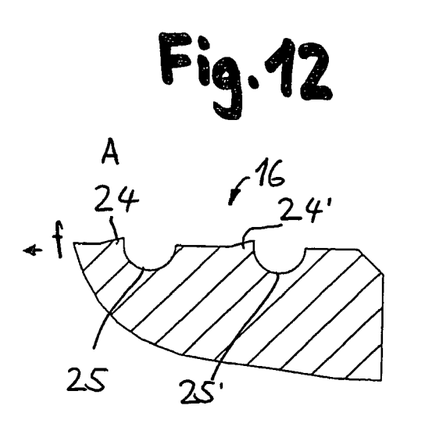
FIG. 12 shows an enlarged illustration of the detail A from FIG. 11.

FIG. 12 shows a very enlarged view of the configuration of the toothing 16 of the clamping sleeve. Said toothing clearly comprises two teeth 24 and 24' arranged one behind the other, with a groove-like recess 25 or 25' adjoining in each case behind each tooth, in relation to the insertion direction f. The teeth 24 and 24' have a slightly conical run-on flank (the inclination angle with respect to the longitudinal mid-axis is between 2 and 15°, for example). At the rear end of the run-on flank of the teeth 24, 24', the recess 25, 25' follows, and this recess first runs approximately perpendicular to the longitudinal mid-axis. The recesses 25, 25' are clearly approximately semicircular. The toothing ensures a secure fit since the elevations 24 and cutouts 25 engage in the bearing interior of the bearing in a form-fitting manner as a result of plastic deformation. However, other configurations of the teeth and/or recesses are of course also conceivable.

Figure 13:
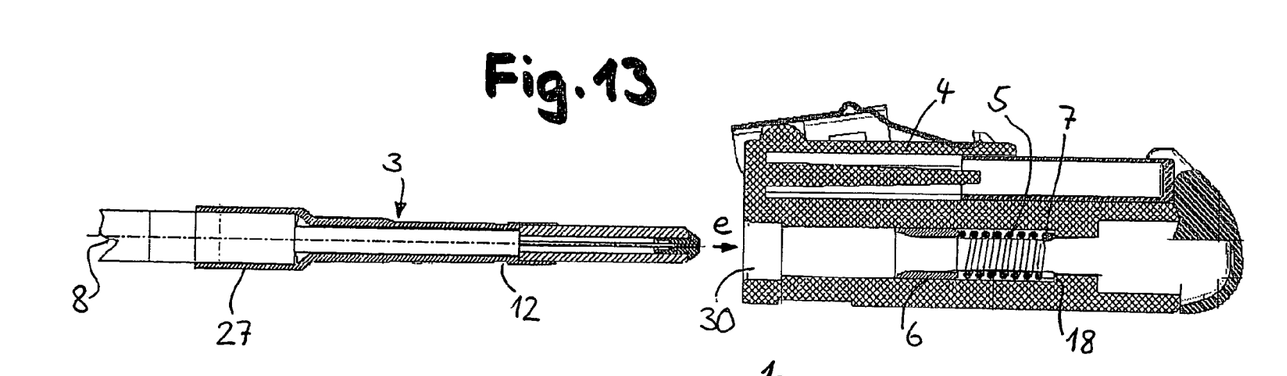
FIG. 13 shows a longitudinal section through a further plug part with a prefitted plug housing and a pin holder prior to said pin holder being pushed into the plug housing.
Figures 14, 15, 16:
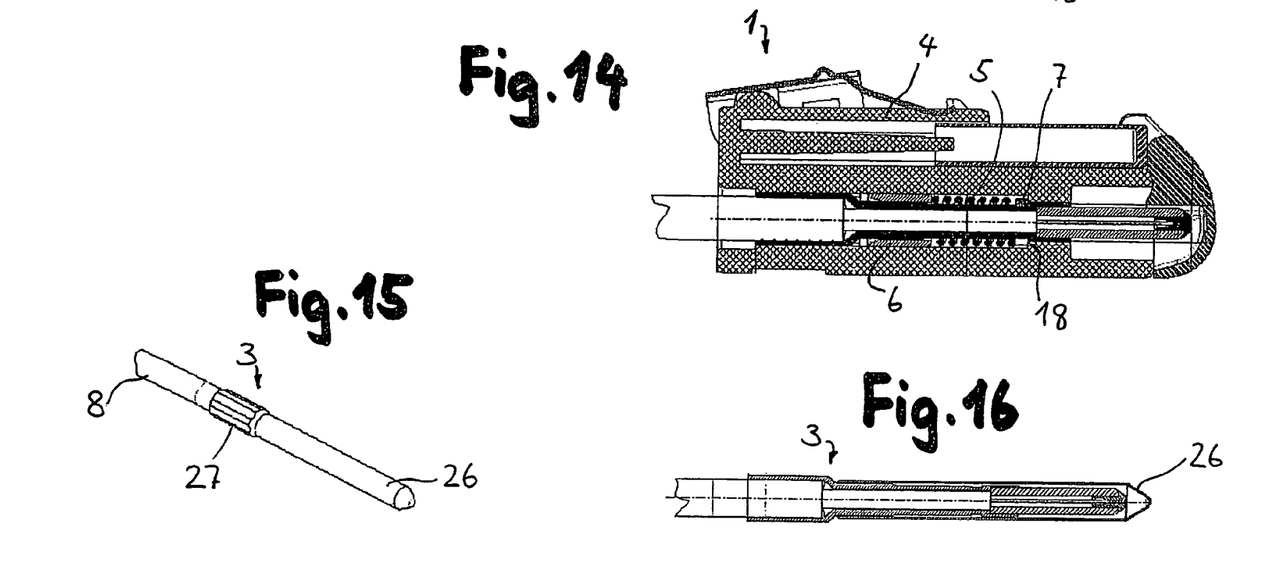
FIG. 14 shows a longitudinal section through the ready-fitted plug part shown in FIG. 13.
FIG. 15 shows a perspective illustration of a front end of a fiber optic cable with the pin holder shown in FIG. 13.
FIG. 16 shows a longitudinal section through the front end of the fiber optic cable shown in FIG. 15.

FIGS. 13 and 14 show a further embodiment of a plug part 1. However, in this case the components (6, 5, 7) for the latching and sprung mounting of the pin holder 3 are inserted into the plug housing in the push-in direction e via the cable-side plug opening 30 (i.e. from behind, rather than from the front). A further difference in relation to the embodiments shown in FIGS. 5 to 9 is the fact that the circlip 7 is not associated with the clamping sleeve 6. As is shown, for example, in FIG. 13, the circlip 7 bears against the circumferential shoulder 18 of the bearing of the plug housing 4, at least in the rest position. The clamping sleeve 6 could also be provided with a toothing (cf. FIGS. 10 to 12) in this embodiment. It would of course also be conceivable in this case to use a spacer sleeve of the type in the exemplary embodiment shown in FIG. 8. FIGS. 13 and 14 then show that the circlip 7 does not necessarily need to have a circular configuration in cross section.

FIG. 15 shows a pin holder 3 which is fastened on a fiber optic cable 8. The pin holder 3 has a polygonal positioning section 27 (polygon), which can be accommodated in the plug housing with an accurate fit in a complementary positioning arrangement in order to secure against rotation. Furthermore, a sleeve-shaped protective cap 26 is shown. It is apparent from the sectional illustration shown in FIG. 16 that the protective cap 26 has been turned over the front end of the pin holder and thus protects the plug pin 2 with the optical waveguide held therein. This fiber optic cable, with the pin holder 3 fastened on the end thereof, can be used for installing an optical fiber network. The cable 8 is conveyed through a tube system by means of a blow-in method. Owing to the solid design of the pin holder with the plug pin held therein and thanks to the protective cap 26, the conveying in the blow-in process can take place without any risk of damage. Once the desired position on an end consumer's premises has been reached, the pin holder 3 is then pushed into a plug housing and locked in latching fashion there in a bearing location so as to produce an optical plug part.

The invention claimed is:

1. A plug part (1) for an optical plug-type connection with at least one pin holder (3), in which a plug pin (2) for accommodating an optical waveguide, which extends over a longitudinal mid-axis (L), is held, and with a plug housing (4) with a cable-side opening (30) and a plug-side opening (31), the pin holder (3) being capable of being pushed into the plug housing (4) in the push-in direction (e) via the cable-side opening (30) and of being locked there in a bearing location, the plug pin (2) being held in axially sprung fashion in the plug housing (4) with the aid of a spring element (5), characterized in that the spring element (5) is a separate component part, which can be inserted into a bearing for accommodating the spring element in the plug housing (4) prior to the pin holder (3) being pushed in.

2. The plug part as claimed in claim 1, characterized in that an at least partially circumferential shoulder (18) for delimiting the spring path in one direction is arranged in the bearing, and the spring element (5) is secured in relation to the opposite direction by a securing element (6), which can be inserted into the bearing and can be or is fixed in the bearing by a force-fitting and/or form-fitting connection.

3. The plug part as claimed in claim 1, characterized in that the spring element (5) is secured by a clamping sleeve (6), which can be inserted into the bearing in the push-in direction (e) via the cable-side opening (30).

4. The plug part as claimed in claim 3, characterized in that the clamping sleeve (6) contains elevations and/or cutouts, which engage in form-fitting fashion in the bearing interior (29) of the bearing as a result of plastic deformation.

5. The plug part as claimed in claim 3, characterized in that the plug housing (4) is made from plastic, at least in the region of the bearing interior (29), and the clamping sleeve (6) is made from metal.

6. The plug part as claimed in claim 3, characterized in that the clamping sleeve (6) or the spacer sleeve (15) has a circumferential notch (17) or a circumferential groove (12) for accommodating the circlip (7) or for resting said circlip thereon, which notch or groove is dimensioned in such a way that it permits the circlip (7) to expand during the push-in process of the pin holder (3) into the plug housing (4) for producing the bearing location.

7. The plug part as claimed in claim 1, characterized in that the spring element (5) is secured in the bearing in the plug housing (4) by a clamping sleeve (6), which can be inserted in the opposite direction (f) from the push-in direction (e) via the plug-side opening (31).

8. The plug part as claimed in claim 1, characterized in that the bearing location of the pin holder (3) in the plug housing (4) is predetermined by latching means (7).

9. The plug part as claimed in claim 1, characterized in that a circlip (7) is arranged in the bearing, and in that the pin holder (3) has a groove (12), which can be brought into latching engagement with the circlip (7) in order to fix the bearing location.

10. The plug part as claimed in claim 9, characterized in that a spacer sleeve (15), which is axially displaceable in the bearing, is arranged between the circlip (7) and the spring element (5).

11. The plug part as claimed in claim 1, characterized in that the pin holder (4) has a positioning section (13), and the plug housing (4) has a positioning arrangement, which is operatively connected to the positioning section (13), as a result of which it is held in the bearing of the plug housing (4) in such a way that it is secured against rotation.

12. The plug part as claimed in claim 1, characterized in that the pin holder (4) is substantially rotationally symmetrical, but at least one cylindrical outer casing is interrupted by a preferably planar incipient cut (13) so as to form an anti-rotation means, and in that sections of the plug housing (4) are configured in complementary fashion on the inside.

13. The plug housing as claimed in claim 12, characterized in that the spring element (5) is secured by a clamping sleeve (6) which has been inserted into the bearing and is fixed in the bearing by a force-fitting and/or form-fitting connection.

14. A prefitted plug housing (4) for a plug part (1) for an optical plug-type connection in particular as claimed in claim 1, with a cable-side opening (30) and a plug-side opening (31), a pin holder (3), in which a plug pin (2) with an optical waveguide, which extends over a longitudinal mid-axis (L), is held, the pin holder (3) being capable of being pushed into the plug housing (4) via the cable-side opening (30) and of being locked there in a bearing location, and the pin holder (3) being held with the plug pin (2) in axially sprung fashion in the plug housing (4) with the aid of a spring element (5), characterized in that the spring element (5) is a separate component part, which has been inserted in a bearing for accommodating the spring element in the plug housing (4).

15. A pin holder (3) for an optical plug-type connection which can be pushed into a plug housing (4) of the plug part (1) and can be locked there in a bearing location so as to form a plug part (1) as claimed in claim 1.

16. A method for installing an optical fiber network, in which a fiber optic cable, which has a pin holder (3) with a plug pin (2) and an optical waveguide held therein fastened on the end of said fiber optic cable, is conveyed through a tube system by means of a blow-in method, and in that, then, the pin holder (3) is pushed into a plug housing (4) and locked there in latching fashion in a bearing location so as to produce an optical plug part in particular as claimed in claim 1.

* * * * *